Aug. 19, 1930.  G. W. GOLDSBORO  1,773,711
CORN PLANTER
Filed June 22, 1928  3 Sheets-Sheet 1
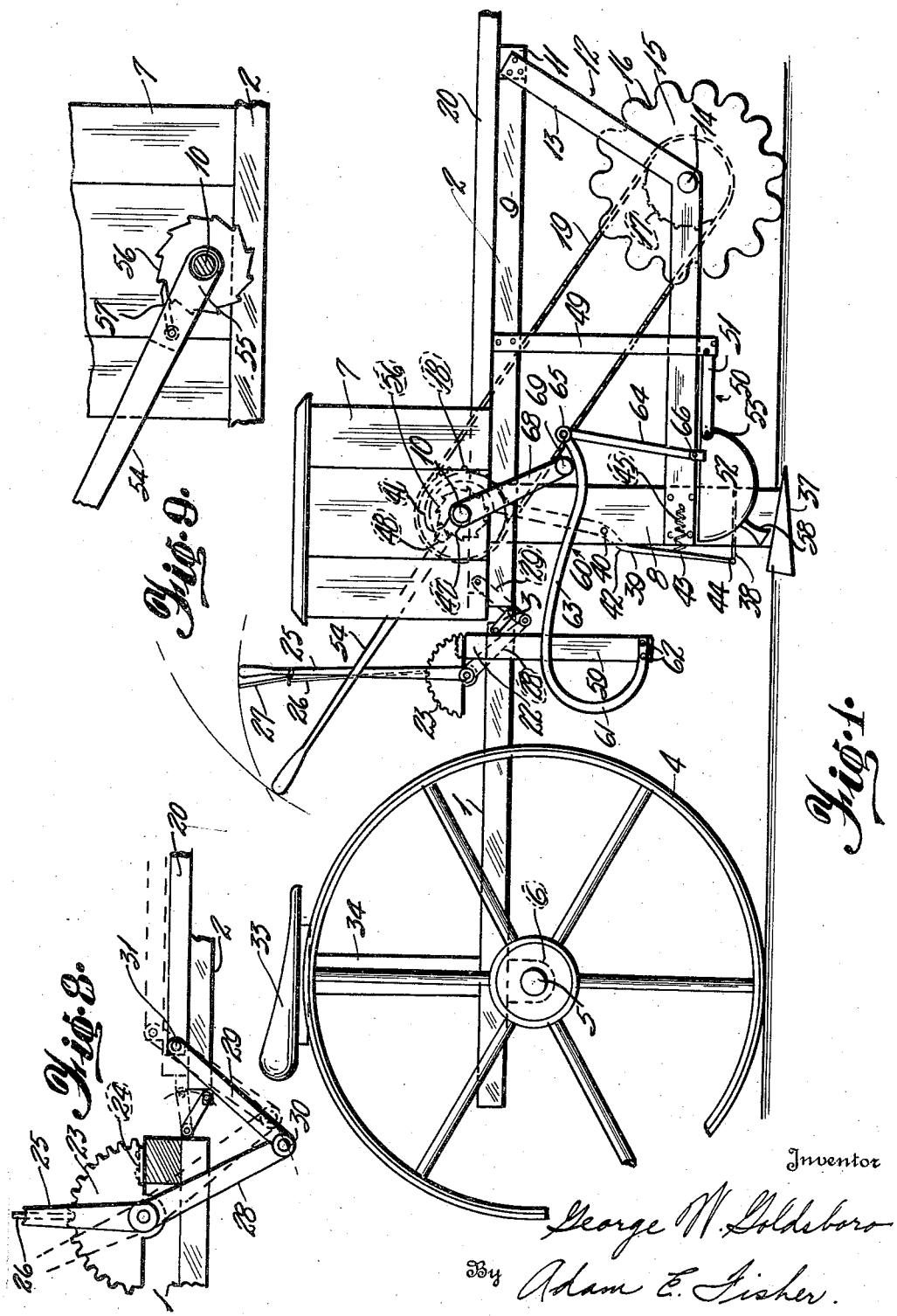

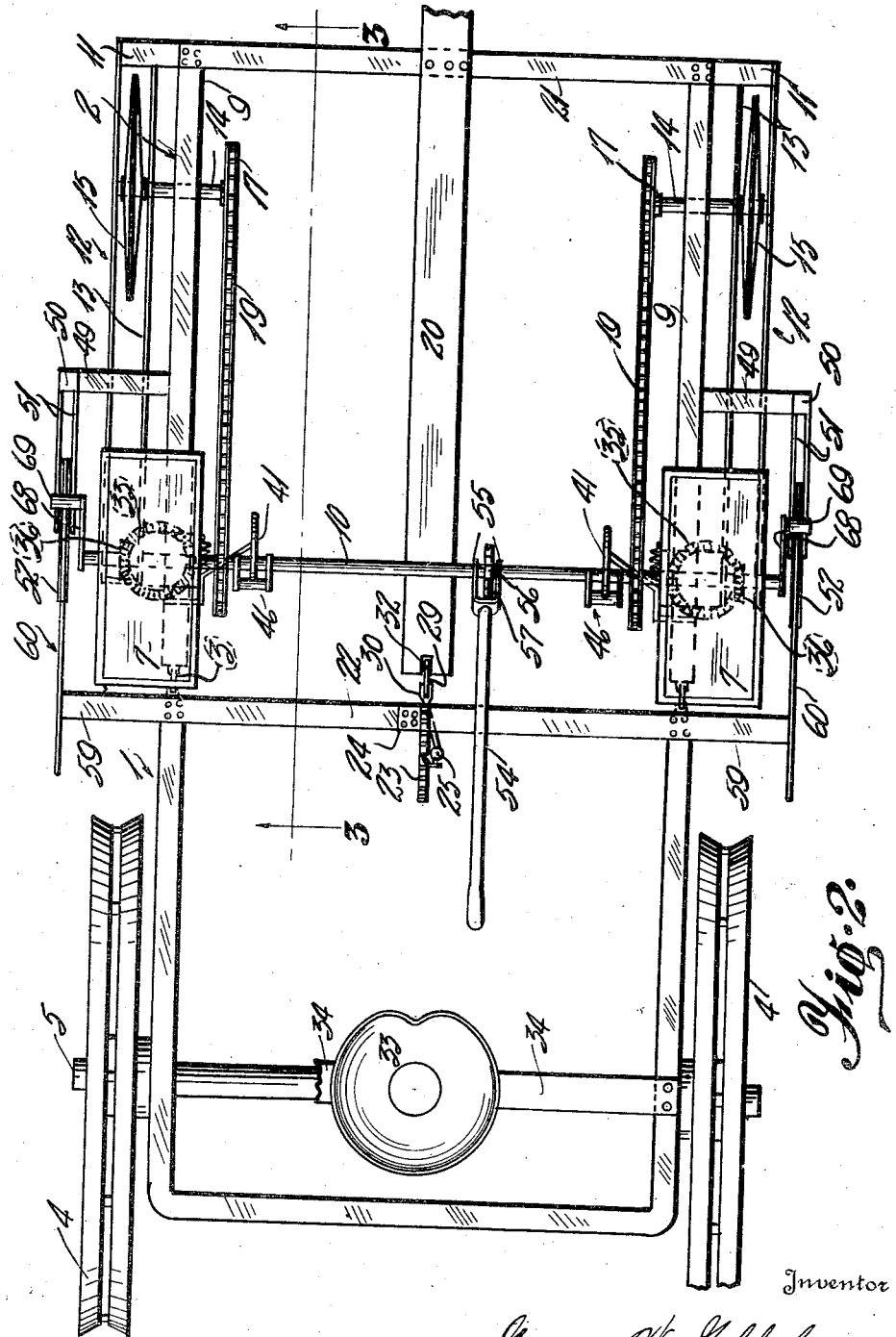

Aug. 19, 1930.  G. W. GOLDSBORO  1,773,711
CORN PLANTER
Filed June 22, 1928  3 Sheets-Sheet 3
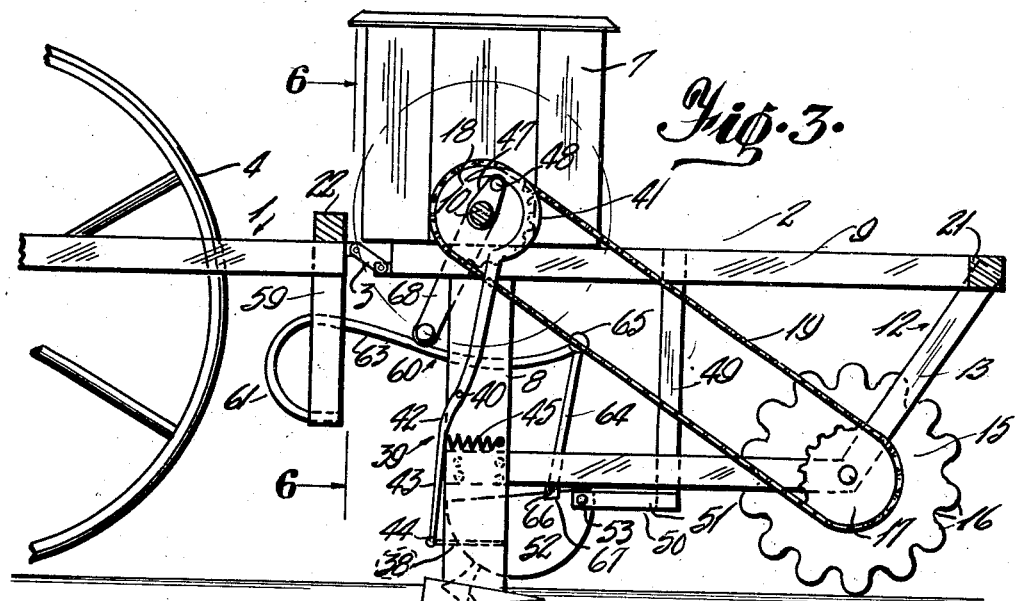
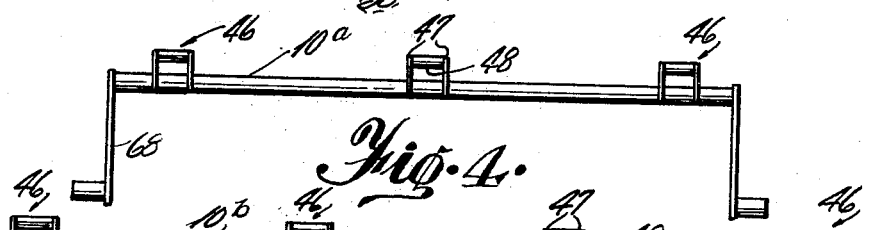
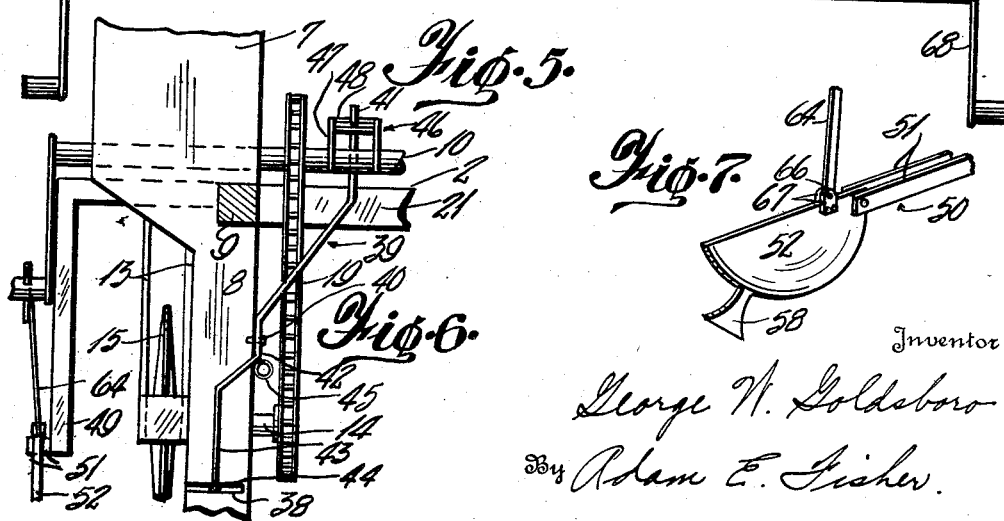
Inventor
George W. Goldsboro
By Adam E. Fisher.
Attorney Patented Aug. 19, 1930

1,773,711

UNITED STATES PATENT OFFICE

GEORGE W. GOLDSBORO, OF LOS ANGELES, CALIFORNIA

CORN PLANTER

Application filed June 22, 1928. Serial No. 287,393.

This invention relates to a machine to plant corn or other grain.

The main object is to provide a simple, and efficient means for operating the grain release and marker mechanisms.

Another object is to provide means for operating the seed release mechanism whereby the grain is deposited in the ground in transverse rows without necessitating the use of the conventional planter wire thus eliminating the lateral draft prevalent in wire operated machines.

A further object is to provide seed releasing and marker mechanisms which may be readily adapted to plant three or more rows of grain simultaneously.

A further object is to provide means whereby the operator or driver may disengage and stop the grain release mechanism when turning at the ends of rows thus effecting a material saving of grain.

A further object is to provide means for adjusting the machine so that it will deposit the grain in proper relationship to the adjoining or finished rows.

A further object is to provide a machine of the above mentioned character which shall be simple and strong in structure and efficient and economical in operation.

With these and other objects in view the invention resides in the novel construction and arrangement of the parts as hereinafter set forth and claimed:

In the drawings:

Figure 1 is a side elevation of a planter constructed in accordance with my invention.

Figure 2 is a plan view thereof.

Figure 3 is a section along the line 3—3 in Figure 2.

Figure 4 is a view of a crankshaft adapted for use in a three row planter.

Figure 5 is a view of a crankshaft adapted for use in a four row planter.

Figure 6 is a section along the line 6—6 in Figure 3.

Figure 7 is a perspective detail of the marker and associated elements.

Figure 8 is a detail view of the mechanism for raising the forward portion of the frame to disengage the seed releasing mechanism.

Figure 9 is a detail view of the crankshaft adjusting lever.

Referring now more particularly to the drawings, I provide a frame comprising the substantially U-shaped sections 1 and 2 of any suitable material flexibly joined together in reverse end to end relationship by pivotal links 3. Wheels 4 are secured upon the ends of an axle 5 which is rotatably mounted in journal boxes 6 adjacent the rear of the rear frame section 1. A seat 33 is mounted over the axle 5 upon brackets 34 extending outwardly and downwardly to the sides of the frame. Conventional seed boxes 7 with vertically depending hollow tubes or chutes 8 are mounted upon the sides 9 of the front frame section 2 at the rear ends and a crankshaft 10 to be more fully described hereinafter is journaled transversely across the frame through the said seed boxes 7. Laterally projecting arms 11 are provided upon the front of the frame, being a continuation of the front rail 21 and secured thereto are the disk frames 12. These disk frames 12 comprise the spaced side members 13 extending rearwardly and downwardly and thence horizontally to the outer sides of the chutes 8 where they are fastened as shown. Stub shafts 14 are journaled in the disk frames 12 and disks 15 are rigidly mounted thereon between the side members 13, the said disks having their peripheries serrated or formed in a plurality of reverse curves as shown to form teeth 16 which contact with the ground as will be hereinafter more fully set forth. The stub shafts 14 extend inwardly from the disk frames 12 and are provided at their ends with rigidly fastened sprocket wheels 17 and sprocket wheels 18 are secured to the crankshaft 10 in alignment therewith. Sprocket chains 19 are trained over the sprocket wheels 17 and 18 and it will be understood that as the machine is drawn forward, as will be set forth, the disks 15 will contact the ground and rotate, turning the crankshaft 10 through the medium of the sprocket wheels 17 and 18 and sprocket chains 19.

The machine is drawn by any suitable means (not shown) attached to the draft tongue 20 which is secured to a medial point of the front bar 21 of the front frame section 2. A transverse bar 22 is secured across the forward ends of the rear frame section 1 and the tongue 20 extends rearwardly and terminates near the same as shown. A semicircular ratchet having ratchet teeth 23 is rigidly secured at a medial point upon the bar 22 by a base plate 24 and a lever 25 is pivoted thereon, the said lever having the conventional spring set ratchet engaging rod 26 and the bell crank operating handle 27 whereby the lever may be retained in any adjusted position. The lever 25 is angularly extended at its lower end in the form of an arm 28 and a link 29 is pivotally secured at one end 30 thereto and has its other end pivotally mounted at 31 in a slot 32 in the rear end of the draft tongue 20. By pulling backward upon the lever 25 the arm 28 and link 29 will coact to raise the forward section 2 of the frame so that the disks 15 will clear the ground and thus the crankshaft 10 will not turn. It is obvious that this disengaging of the operating elements will be of advantage in turning at the ends of rows and other like occasions. Also it will be understood that by this means the depth at which the seed is planted may be varied.

For the seed drilling means for feeding the seed in predetermined quantities from the seed boxes 7 into the tubes 8 the conventional art is resorted to such as the toothed plates 35 operated by pinions 36 on the crankshaft 10 as shown in Figure 2. Shoes or furrow openers 37 of any approved construction are secured upon the lower ends of the seed tubes 8 in such manner that they will open a furrow in the ground into which the seed may be deposited. Slide valves 38 regulate the dropping of the seed from the tubes into the furrow, the said slide valves being operated by levers 39, the aforesaid elements 38 and 39 constituting a seed releasing means. These levers 39 are fulcrumed at 40 upon the inner sides or walls of the seed tubes 8, extend upwardly and inwardly with respect to the seed tubes 8 and terminate in the arcuate portions 41 adapted to partially encircle the crankshaft 10 at a point spaced from the seed boxes 7 for a purpose to be later set forth. The levers 39 are also bent at 42 around the corners of the seed tubes 8 to the rear side thereof and extend downwardly to form the arms 43 pivotally connected at their lower ends to the slide valves 38 as at 44. Retractile coil springs 45 normally hold the levers 39 and the slide valves 38 in the closed position. Trips 46 are formed upon the crankshaft 10 in alignment with the arcuate portions 41 of the levers 39 and comprise the spaced side members 47 and the rollers 48. As the crankshaft 10 is rotated by the means recited the trips 46 will strike the points of the arcuate portions 41 causing the levers 39 to swing upon the pivots 40 opening the valves 38. As the crankshaft 10 rotates further the trips 46 will disengage the levers 39 and the coil springs 45 will return the valves 38 to the closed position. In Figure 1 the trips 46 are shown as they are about to engage the levers 39 and in Figure 3 they are shown as they have disengaged the said levers 39.

An adjustment lever 54 is provided having its forked ends 55 rotatably mounted upon the crankshaft 10 and a toothed ratchet wheel 56 is rigidly secured upon the said crankshaft between the ends 55, a tooth or pawl 57 pivoted on the said lever being adapted to engage the teeth upon the wheel 56. By lifting the lever 54 upward the crankshaft 10 may be turned so that the trips 46 will engage the levers 39 causing the valves 38 to release the seed at any desired point, it being understood that the forward section of the frame be raised at the same time. The crankshaft 10 will be free to turn within the lever 54 in the ordinary course of operation.

Inverted L-shaped hangers 49 are secured to the outer margins of the side members 9 at a point spaced forwardly from the seed boxes 7. Brackets 50 having spaced sides 51 are secured at one end to the lower ends of the hangers 49 and extend horizontally and rearwardly as shown. Semicircular marker elements 52 are pivotally connected at their upper corners between the free ends of the brackets 50 by a pivot pin 53 and marking teeth or feet 58 are secured to or formed integrally with the lower rear margins of the said markers. The ends of the transverse bar 22 extend laterally outward from the frame and are bent downwardly to form hanger arms 59. Spring marker operators 60 are provided, being substantially J-shaped and formed of any suitable relatively heavy spring bar material. The curved ends 61 of the hangers 60 are secured to the lower ends of the hanger arms 59 by bolts 62 and the curved arms 63 extend forwardly and are disposed parallel with the frame as shown in Figures 1, 2 and 3. Links 64 are pivotally connected at 65 with the forward ends of the arms 63, the said links 64 extending downwardly and being pivotally connected at 66 in ears 67 upon the upper margin of the markers 52 at a point spaced rearwardly from the connection with the brackets 50. Crank arms 68 are secured upon the outer extended ends of the crankshaft 10 and have rollers 69 upon their outer or free ends.

It will now be understood that as the crankshaft is rotated as hereinbefore recited the crank rollers 69 will engage the arms 63 of the marker operators 60 forcing the same downward so that the markers 52 and feet 58 will be pressed into the ground. As the crankshaft continues its rotation the rollers will disengage the arms 63 of the marker operators 60 and the resiliency thereof will raise the markers out of the ground to their inoperative position as shown in Figure 1. Attention is called to the fact that the crank arms 68 are diametrically opposite the trips 46 so that the mark will be made in the ground simultaneously with the dropping of the seed.

From the foregoing taken in connection with the drawings it will be evident that I provide a machine which is efficient and simple in operation and which may be readily adjusted to deposit the seed at any desired points and which will mark the ground adjacent the points at which the seed is deposited. Since there is no planter wire used the lateral draft or tendency to swing to one side when planting is overcome. It will be noted that the spacing between the points at which the seed is deposited may be readily varied by the use of sprocket wheels of different diameters upon the stub shafts 14.

In Figures 4 and 5 I show modifications of the crankshaft which are adapted for use in machines to plant three or four rows of grain simultaneously. This is readily accomplished by proper widening of the frame and the use of either three or four seed boxes and seed releasing means of the type and operation herein set forth. In this case the marks will be made only adjacent the two outside rows as will be understood.

While I have herein set forth a preferred embodiment of my invention it is understood that I may vary the structural details thereof within the scope of the appended claims.

I claim:

1. In a machine of the class described, a wheel borne frame, seed boxes with depending seed tubes mounted on the frame, a crankshaft journaled through the seed boxes, disks rotatably mounted on the frame to contact the ground, means connecting the disks and the crankshaft whereby the same will be rotated as the machine is drawn forward, interdependent elements upon the seed tubes and crankshaft adapted to coact and release the seed as the crankshaft rotates, marker elements mounted on the frame, spring set marker operators on the frame adjacent the seed tubes connected with the marker elements and means upon the crankshaft to intermittently engage the marker operators.

2. In a machine of the class described, a wheel borne frame comprising front and rear sections flexibly joined together, means for raising and lowering the front section thereof, seed boxes with depending tubes mounted on the frame, a crankshaft journaled through the seed boxes and extending outwardly therethrough at its ends, disks rotatably mounted on the forward section of the frame to contact the ground, means connecting the disks and the crankshaft whereby the same will be rotated as the machine is drawn forward, seed valves slidably mounted in the seed tubes, spring set levers pivoted on the seed tubes and connected to the seed valves at their lower ends, the said levers having upper arcuate portions adjacent the crankshaft, trips upon the crankshaft to engage the said upper arcuate portions of the levers, spring set marker elements operatively associated with the frame and cranks upon the said extended ends of the crankshaft to engage the marker elements.

3. In a machine as claimed in claim 2, the said marker elements, comprising semicircular markers having trailing marking feet, the said markers being pivotally mounted by their upper margins to the frame, and spring set marker operators secured to the frame at one end, the opposite ends extending forwardly and links connecting the same with the markers.

4. In a marking mechanism for planters, in combination with a planter frame and a rotatable crankshaft having cranks at its ends, semicircular marking elements pivoted by one corner in the frame, marking teeth upon the said elements, J-shaped spring set marker operators secured by their curved ends to the frame and having their arms extended forwardly and adapted to be engaged by the said cranks on the crankshaft and links pivotally and eccentrically connecting the said forwardly extended arms and the marking elements.

In testimony whereof I affix my signature.

GEORGE W. GOLDSBORO.